(12) United States Patent
Wang

(10) Patent No.: US 10,442,325 B2
(45) Date of Patent: Oct. 15, 2019

(54) ENERGY AND SHOCK ABSORBING DEVICE FOR A CHILD CAR SEAT

(71) Applicant: Goodbaby Child Products Co., Ltd, Kunshan, Jiangsu (CN)

(72) Inventor: Haiye Wang, Jiangsu (CN)

(73) Assignee: Goodbaby Child Products Co., Ltd, Jiangsu (CN)

( * ) Notice: Subject to any disclaimer, the term of this patent is extended or adjusted under 35 U.S.C. 154(b) by 52 days.

(21) Appl. No.: 14/915,505

(22) PCT Filed: Dec. 26, 2013

(86) PCT No.: PCT/CN2013/090515
§ 371 (c)(1),
(2) Date: Feb. 29, 2016

(87) PCT Pub. No.: WO2015/027650
PCT Pub. Date: Mar. 5, 2015

(65) Prior Publication Data
US 2016/0207427 A1    Jul. 21, 2016

(30) Foreign Application Priority Data

Aug. 29, 2013   (CN) ..................... 2013 2 0533171 U

(51) Int. Cl.
*B60N 2/28* (2006.01)
*B60N 2/427* (2006.01)
*B60N 2/42* (2006.01)

(52) U.S. Cl.
CPC ........... *B60N 2/2884* (2013.01); *B60N 2/286* (2013.01); *B60N 2/2821* (2013.01);
(Continued)

(58) Field of Classification Search
None
See application file for complete search history.

(56) References Cited

U.S. PATENT DOCUMENTS 3,578,376 A * 5/1971 Hasegawa ................ B60N 2/07
296/68.1
4,396,220 A * 8/1983 Dieckmann .......... B60N 2/4235
296/68.1
(Continued)

FOREIGN PATENT DOCUMENTS

EP           1593545 A2    11/2005
WO      WO2009062505 A1     5/2009

*Primary Examiner* — David E Allred
(74) *Attorney, Agent, or Firm* — Stites & Harbison PLLC; Sean P. Ritchie

(57) ABSTRACT

An energy and shock absorbing device for a child car seat comprises a seat (1), and a base (2) positioned below the seat (1) and used for supporting the seat (1), the seat (1) being slidably arranged on the base (2). A limit block (22) is formed on the base (2) and located in front of the seat (1) in a path along which the seat (1) slides relative to the base (2). Energy absorbing material (4) is arranged between the limit block (22) and the seat (1), and is compressed to deform when the seat (1) slides towards the limit block (22). When a car encounters a collision or emergency brake, the seat (1) moves relative to the base (2) due to inertia, and the energy absorbing material (4) is squeezed to deform so as to provide a buffering and shock absorbing action. The word "front" described here and elsewhere is defined according to the moving direction of the seat (1), that is, the direction along which the seat (1) slides relative to the base (2) when a car collision occurs is front, and conversely, the direction opposite to front is rear.

7 Claims, 10 Drawing Sheets

(52) U.S. Cl.
CPC ......... *B60N 2/2866* (2013.01); *B60N 2/2875* (2013.01); *B60N 2/2887* (2013.01); *B60N 2/4214* (2013.01); *B60N 2/4221* (2013.01); *B60N 2/4228* (2013.01); *B60N 2/42709* (2013.01); *B60N 2/42736* (2013.01)

(56) References Cited

U.S. PATENT DOCUMENTS

| | | | | |
|---|---|---|---|---|
| 4,655,503 A * | 4/1987 | Kamijo | ................ | B60N 2/203 297/103 |
| 4,709,960 A | 12/1987 | Launes | | |
| 4,752,980 A * | 6/1988 | Nafte | ................ | A47D 9/04 5/108 |
| 5,303,433 A * | 4/1994 | Jang | ................ | A47D 9/04 5/109 |
| 5,626,203 A * | 5/1997 | Habib | ................ | B60N 2/0276 180/274 |
| 5,664,830 A | 9/1997 | Garcia et al. | | |
| 5,685,603 A | 11/1997 | Lane, Jr. | | |
| 6,039,344 A * | 3/2000 | Mehney | ................ | B60N 2/002 177/144 |
| 6,382,718 B1 * | 5/2002 | Janke | ................ | B60N 2/4221 248/563 |
| 7,159,923 B2 * | 1/2007 | Rajasingham | ........... | A61G 5/04 296/65.11 |
| 7,338,118 B2 * | 3/2008 | Ichikawa | ............... | B60N 2/071 297/216.1 |
| 7,341,645 B2 * | 3/2008 | Fong | ................ | B60N 2/4221 296/68.1 |
| 8,046,851 B2 * | 11/2011 | Ahlman | ................ | A61B 6/0442 5/613 |
| 8,138,908 B2 * | 3/2012 | Rajasingham | ..... | B60N 2/42736 296/65.11 |
| 8,556,341 B1 * | 10/2013 | Connaughty | ........... | F16F 15/08 297/216.16 |
| 8,632,124 B2 * | 1/2014 | Clement | ............... | B60N 2/2821 297/216.11 |
| 8,827,366 B2 * | 9/2014 | Hopke | ................ | A47D 9/02 297/344.17 |
| 2002/0113469 A1 * | 8/2002 | Stern | ................ | A47D 13/10 297/256.16 |
| 2006/0076809 A1 * | 4/2006 | Ravid | ................ | B60N 2/4242 297/216.1 |
| 2007/0228784 A1 * | 10/2007 | Wells, Jr. | ............. | B60N 2/4228 297/216.14 |
| 2007/0262627 A1 * | 11/2007 | Clapper | ................ | A47D 9/02 297/260.2 |
| 2007/0284922 A1 * | 12/2007 | Matsuhashi | .......... | B60N 2/1615 297/216.2 |
| 2008/0136236 A1 * | 6/2008 | Kincaid | ................ | A47D 9/02 297/260.2 |
| 2008/0179928 A1 * | 7/2008 | Chen | ................ | A47D 13/10 297/260.1 |
| 2009/0102253 A1 * | 4/2009 | Forbes | ................ | B60N 2/2821 297/216.11 |
| 2011/0227376 A1 * | 9/2011 | Franck | ................ | B60N 2/2809 297/216.11 |
| 2014/0239684 A1 * | 8/2014 | Mindel | ................ | B60N 2/2824 297/216.18 |
| 2014/0339864 A1 * | 11/2014 | Mizobata | ................ | B60N 2/888 297/216.12 |

* cited by examiner

ENERGY AND SHOCK ABSORBING DEVICE FOR A CHILD CAR SEAT

CROSS REFERENCE TO RELATED APPLICATIONS

This application is a § 371 National State Application of PCT/CN2013/090515 filed Dec. 26, 2013 which claims priority to CN 201320533171.1 filed Aug. 29, 2013.

TECHNICAL FIELD

The present invention relates to a child car seat.

BACKGROUND OF INVENTION

In prior art, when a child car seat is installed onto a car seat within a car for use, the child car seat is fixed relative to the car seat, and a safe belt tied to the child car seat performs buffer action when accident such as collision happens. However, the safe belt can only protect the child in the car seat via buffering and shock absorbing actions, but can scarcely protect the car seat itself. Generally, a child car seat includes a seat and a base fixedly connected together, and in actual use, when collision occurs, the seat will wobble relative to the base due to inertia so as to that the connected location between the seat and the base is prone to deform or even break.

SUMMARY

The present invention is intended to provide an energy and shock absorbing device for a child car seat for protecting the seat of the car seat via shock absorbing action.

To achieve the above purpose, the present invention provides an energy and shock absorbing device for a child car seat, which comprises a seat and a base for supporting the seat, the seat being provided on the base slidably along a path. A limit block is formed on the base, and located in front of the seat in the path along which the seat slides relative to the base. Energy absorbing material is arranged between the limit block and the seat, and is compressed to deform when the seat slides towards the limit block. When a car encounters a collision or emergency brake, the seat moves relative to the base due to inertia, and the energy absorbing material is squeezed to deform so as to provide a buffering and shock absorbing action. The word "front" described here and elsewhere is defined according to the moving direction of the seat, that is, the direction along which the seat slides relative to the base when a car collision occurs is front, and conversely, the direction opposite to front is rear.

Further, the seat comprises a seat body and a frame detachably connected to the bottom of the seat body, and a sliding block is provided at the bottom of the frame and sliding fitting with the base. The seat employs a split type structure of the seat body and the frame, and is convenient for disassembly, maintenance and separate replacement of the frame.

Further more, the frame comprises a crossbeam extending along the left-right direction, and the sliding block is provided at the left and/or right portion(s) of the crossbeam. The "left" and "right" described here and elsewhere are defined according to the above-mentioned "front" and "rear", i.e., the seat moves along the front-rear direction, and the transverse direction perpendicular to the front-rear direction is the left-right direction.

Further more, a clamping seat is provided on the seat body, a snap-fit is disposed on the frame, and the seat body and the frame are detachably connected by plugging-connected cooperation between the clamping seat and the snap-fit.

In a specific embodiment, a sliding block is provided at the bottom of the seat, and the seat is relatively slidably connected with the base via the sliding block, and the energy absorbing material is provided between the sliding block and the limit block. The seat employs an integrated structure, and the sliding block the formed at bottom thereof is not only convenient for sliding relative to the base, but also convenient for contacting the energy absorbing material.

In a specific embodiment, a sliding rail is provided on the base for supporting the seat to slide, and the sliding rail linearly extends along the front-rear direction.

More specifically, the sliding rail extends along the horizontal direction.

More specifically, the sliding rail extends along a direction tilted to the horizontal plane, and the front end of the sliding rail is higher or lower than the rear end of the sliding rail.

In another specific embodiment, a sliding rail is provided on the base for supporting the seat to slide and extends along the front-rear direction, and the sliding rail extends along an arc line. When a collision happens, the seat slides along the arc line and compress the energy absorbing material to deform so as to provide a buffering and shock absorbing action.

In a specific embodiment, the energy absorbing material is selected from one or more of foam metal, a thin-walled tube product and polyurethane foam. More specifically, the energy absorbing material is foam aluminum.

Preferably, the base is below the seat.

In a specific embodiment, the limit block is formed by extending the base upwards.

The scope of the present invention is not limited to technical schemes specifically combined by the above technical features, and should encompass other technical schemes formed by any combination of the above technical features or the equivalent features thereof. For example, the technical scheme is formed by substituting between the above technical features and, but not limited to, the technical features with similar functions disclosed by the present invention.

Due to the use of the above technical schemes, the present invention has the following advantages over the prior art: the seat and the base employ a relative slidable connection; when a collision happens, the seat slides relative to the base, and the energy absorbing material between the seat and the limit block on the base is squeezed to deform so as to provide a buffering and shock absorbing action for protecting the seat and the child within the seat.

Figure 1:
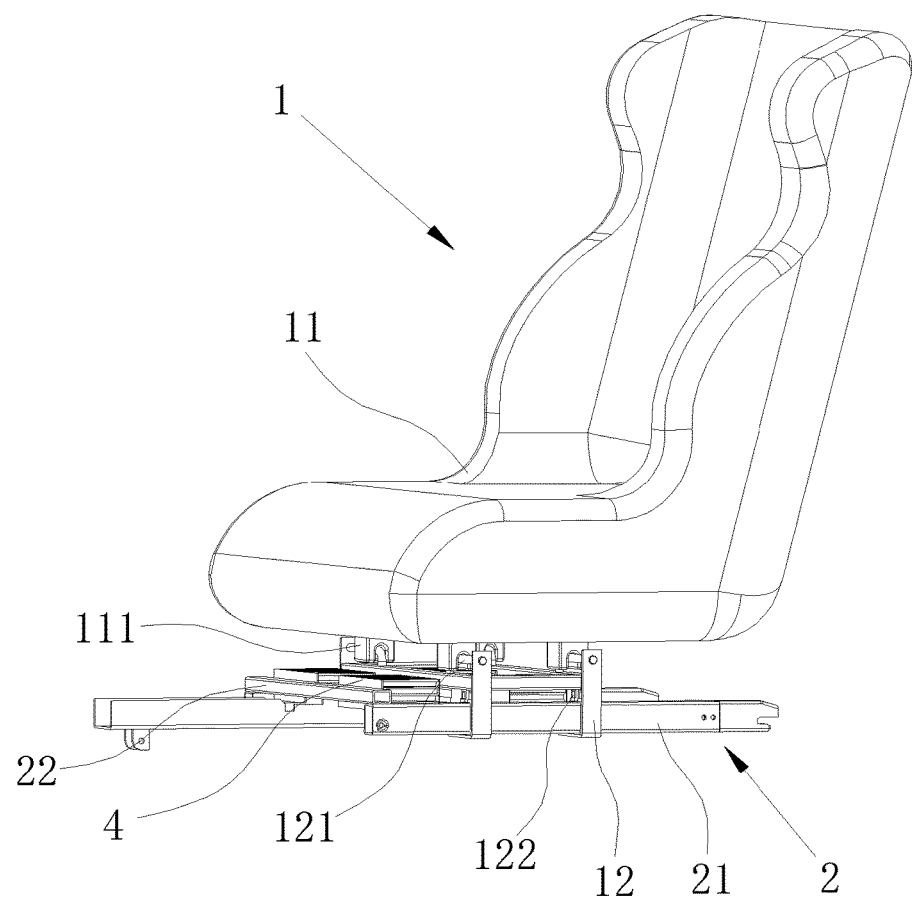
FIG. 1 is a space diagram of a child car seat of Embodiment 1 according to the present invention.
Figure 2:
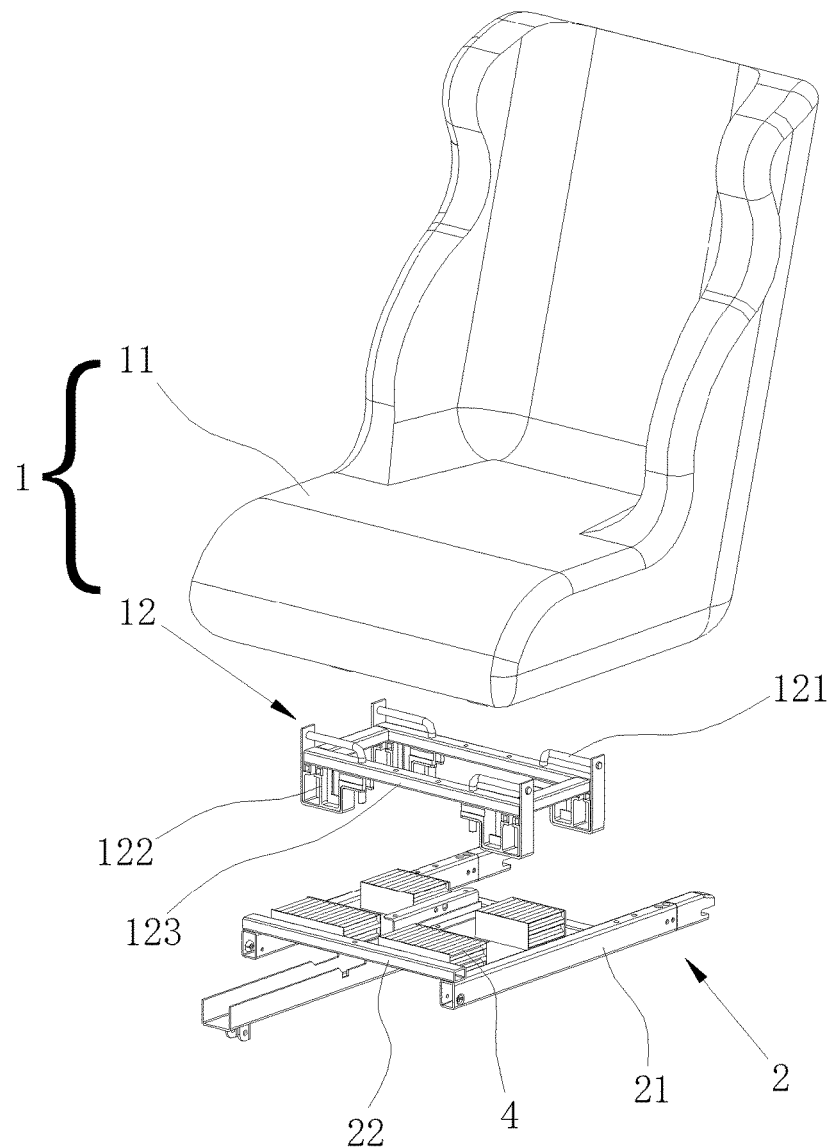
FIG. 2 is a space exploded view of the device shown in FIG. 1.
Figure 3:
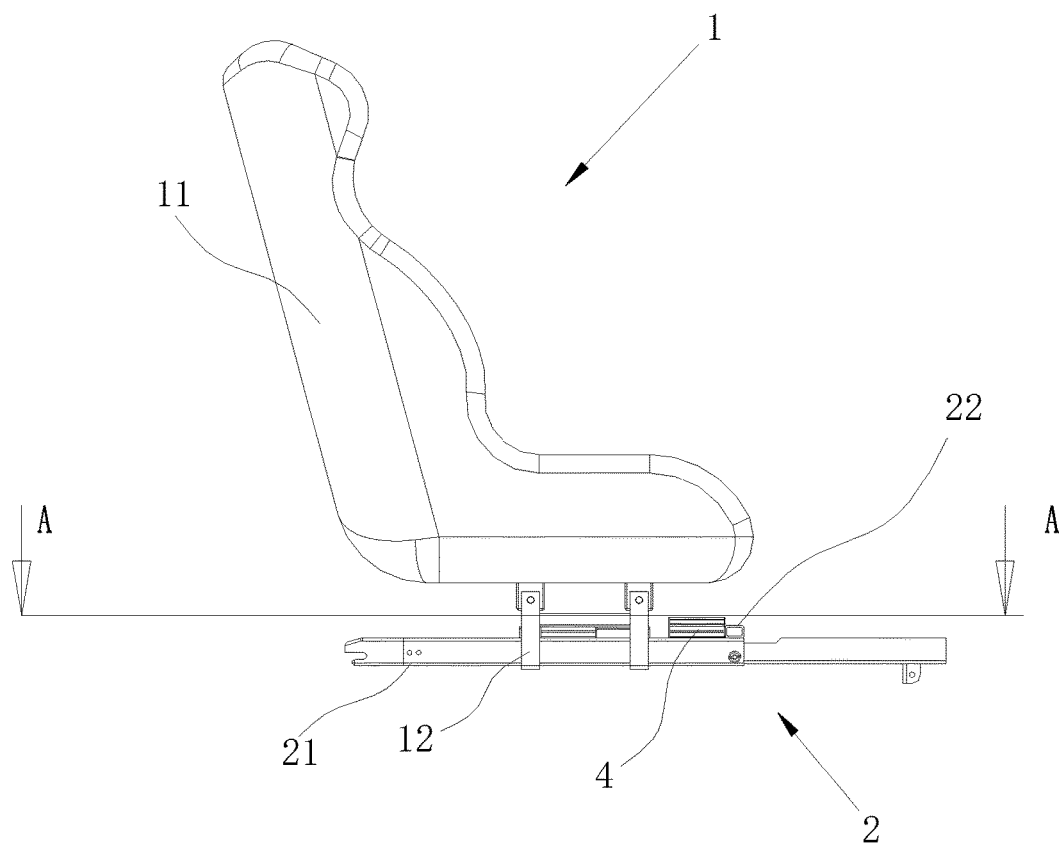
FIG. 3 is a side view of the device shown in FIG. 1.
Figure 4:
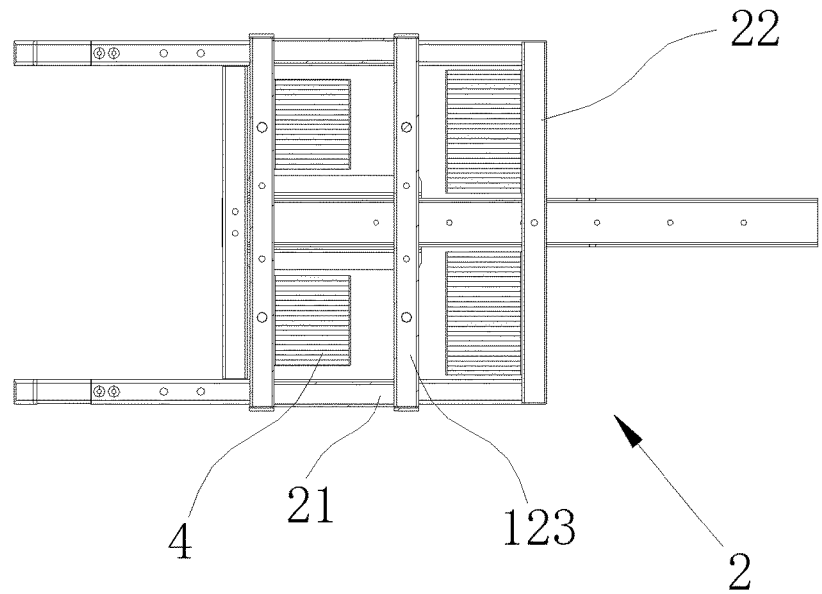
FIG. 4 is a sectional view of the device alone the line A-A in FIG. 3.
Figure 5:
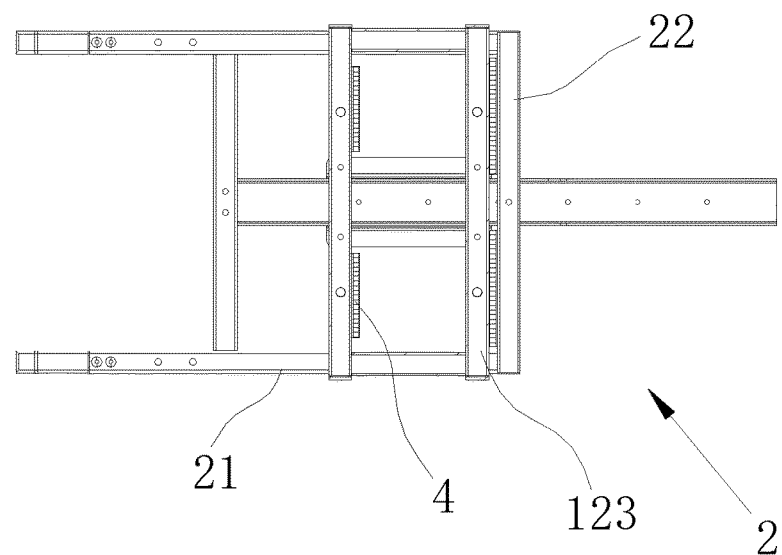
FIG. 5 is a view showing the action of the device shown in FIG. 4 when a collision happens.

wherein: 1. seat; 11. seat body; 111. clamping seat; 12. frame; 121. snap-fit; 122. sliding block; 123. crossbeam;

10. sliding block;

2. base; 21. sliding rail; 22. limit block;

4. energy absorbing material.

DETAILED DESCRIPTION OF EMBODIMENTS

In the following, the preferable embodiments of the present invention are explained in detail combining with the accompanying drawings.

Embodiment 1

An energy and shock absorbing device shown in FIGS. 1-5 comprises a seat 1 and a base 2 located below the seat 1 for supporting the seat 1, and the seat 1 is slidably provided on a sliding rail 21. The base 2 bulges upwards to form a limit block 22, and the limit block 22 is located in front of the seat 1 in the path along which the seat 1 slides relative to the sliding rail 21; and energy absorbing material 4 is arranged between the limit block 22 and the seat 1.

The energy absorbing material 4 is a known material, and there are many kinds of energy absorbing material such as foam metal, etc. In the present invention, the energy absorbing material 4 is preferably employs foam aluminum. When the seat 1 slides towards the limit block 22 relative to the base 2 and compress the energy absorbing material 4 so as to deform the energy absorbing material 4 to provide buffering and shock absorbing actions for the seat 1.

In this embodiment, the seat 1 employs a split type structure, i.e., the seat 1 mainly consists of a seat body 11 and a frame 12 detachably connected to the bottom of the seat body 11. The frame 12 comprises a crossbeam 123 extending along the left-right direction, and a sliding block 122 provided at bottom of the left and right portions of the crossbeam 123, the sliding block 122 is sliding fitting with the sliding rail 21.

Particularly, a clamping seat 111 is provided on the seat body 11, a snap-fit 121 is disposed on the frame 12, and the seat body 11 and the frame 12 are detachably connected by plugging-connected fit between the clamping seat 111 and the snap-fit 121.

In the embodiment shown in FIGS. 1-5, the pathway of the sliding rail 21 providing support for the seat 1 to slide linearly extends along the horizontal direction. When a car encounters a collision or emergency brake, the seat 1 slides forwards relative to the base 2, and the energy absorbing material 4 is squeezed by the crossbeam 123, the sliding block 122 and the limit block 22, and compressed to deform so as to provide a buffering and shock absorbing effect for seat 1.

Embodiment 2

Figure 6:
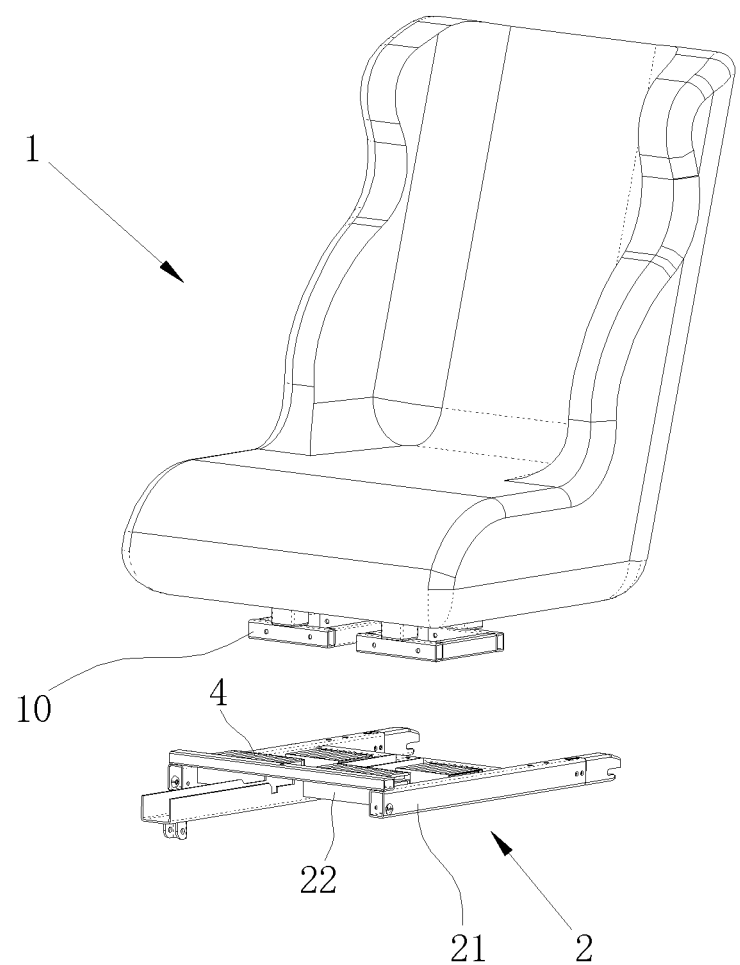
FIG. 6 is a space exploded diagram of a child car seat of Embodiment 2 according to the present invention.

The present embodiment shown in FIG. 6 has a similar structure with Embodiment 1 discussed above, by differing in that: the seat 1 does not employ a split type structure, but uses an integrated structure with a sliding block 10 at the bottom of the seat 1.

As shown in FIG. 6, the sliding block 10 is provided on the sliding rail 21, and the energy absorbing material 4 is provided between the sliding block 10 and the limit block 22.

The operating principle and manner of this embodiment is similar with Embodiment 1, but differing in that, the seat of this present embodiment is undetachable under normal circumstances, and thus the flexibility and firmness of the sliding block 10 are required in practical applications.

Embodiment 3

Figure 7:
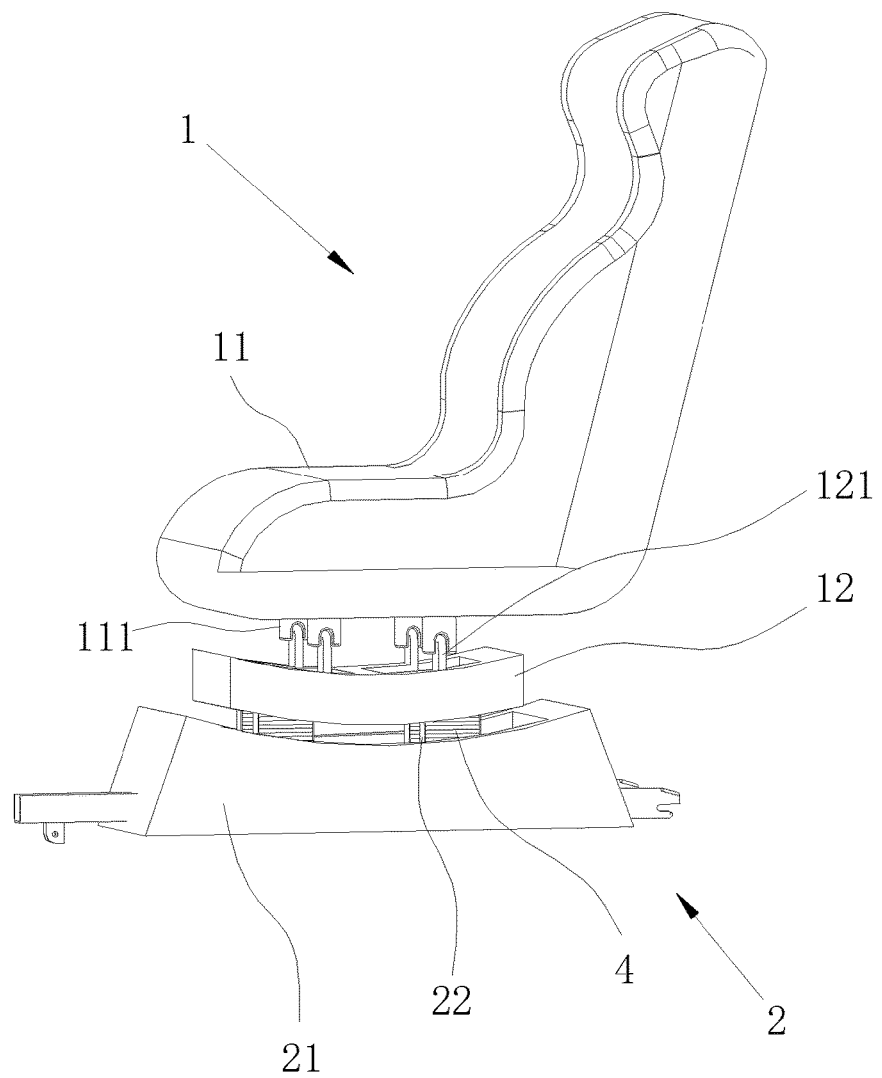
FIG. 7 is a space diagram of a child car seat of Embodiment 3 according to the present invention.
Figure 8:
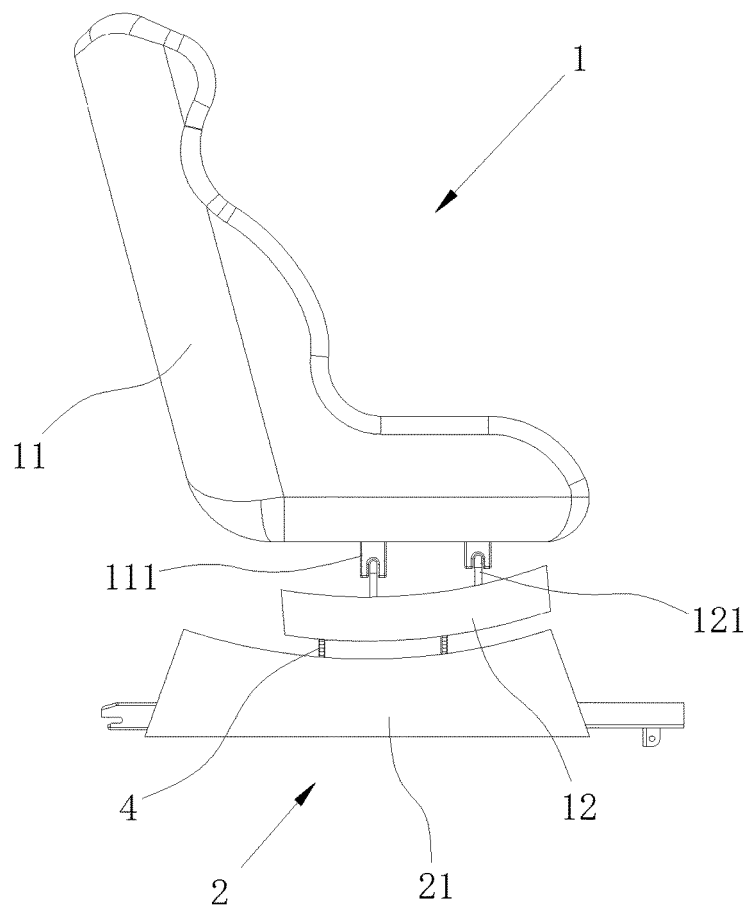
FIG. 8 shows the action of the structure shown in FIG. 7 when a collision happens.

As shown in FIGS. 7-8, the seat 1 and the base 2 of the present embodiment also employ a relatively slidable connection, but differing in that, the pathway of the sliding rail 21 providing support for the seat 1 to slide extends along an arc line, and other structures of the present embodiment implement referring to Embodiment 1. When a car encounters a collision or emergency brake, the seat 1 slides along the arc pathway, and the energy absorbing material 4 is squeezed by cooperating between the frame 12 and the limit block 22, and deforms so as to provide an energy and shock absorbing protect for seat 1.

Embodiment 4

Figure 9:
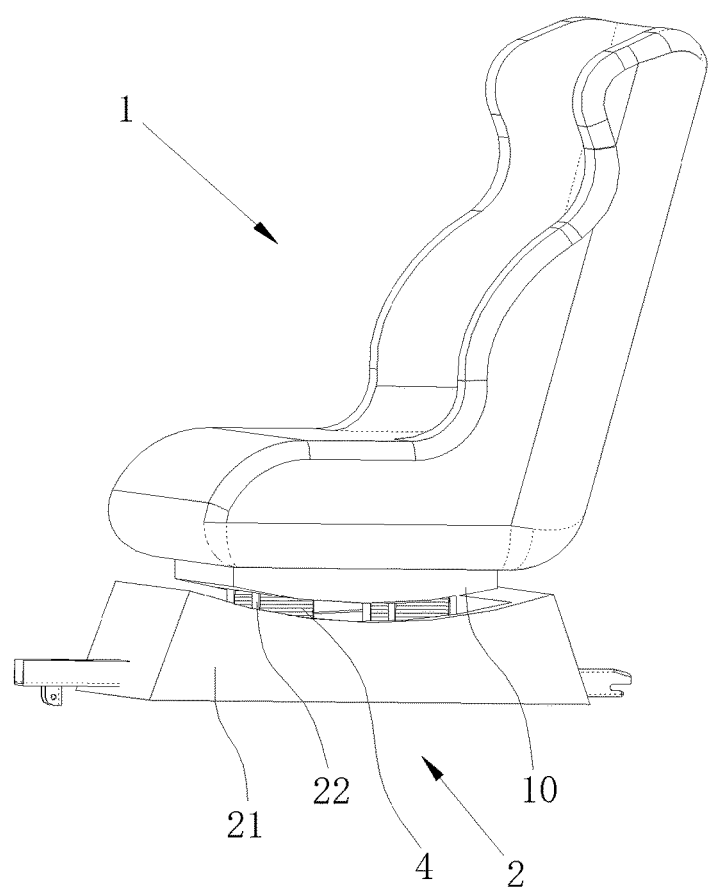
FIG. 9 is a space diagram of a child car seat of Embodiment 4 according to the present invention.

As shown in FIG. 9, the present embodiment has a similar structure with Embodiment 3, by differing in that: the seat 1 does not employ a split type structure, and uses an integrated structure with a sliding block 10 at the bottom of the seat 1.

Embodiment 5

Figure 10:
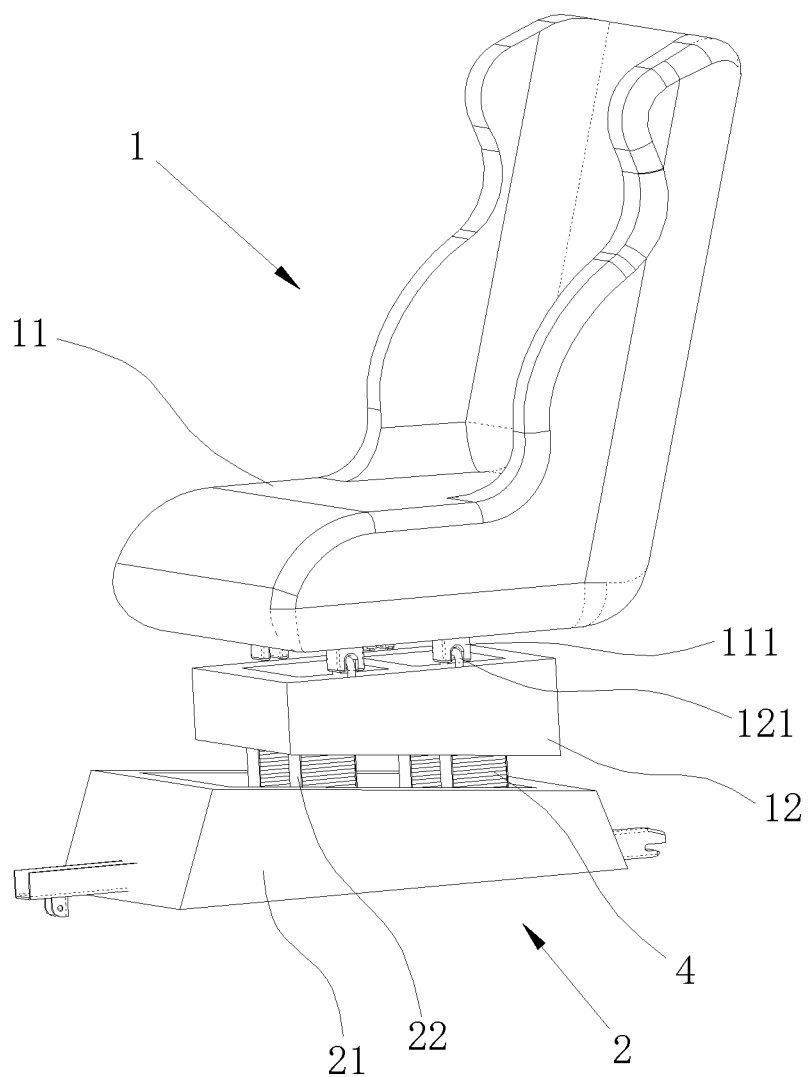
FIG. 10 is a space diagram of a child car seat of Embodiment 5 according to the present invention.

As shown in FIG. 10, the present embodiment has a similar structure with Embodiment 1, by differing in that: in this embodiment, the pathway of the sliding rail 21 providing support for the seat 1 to slide extends along direction tilted to the horizontal plane, and the front end of the pathway is higher than the rear end thereof. When a collision happens, the seat 1 slides along the upward pathway, and the energy absorbing material 4 is compressed by cooperating between the frame 12 and the limit block 22, and deforms so as to achieve the energy and shock absorbing purpose.

The present embodiment may refer to variations of Embodiments 1 and 2, and employs an integrated structure with a sliding block at the bottom of the seat 1. Due to that it may refer to the above implementation, there is no more detailed description referring to accompanying drawings.

Embodiment 6

Figure 11:
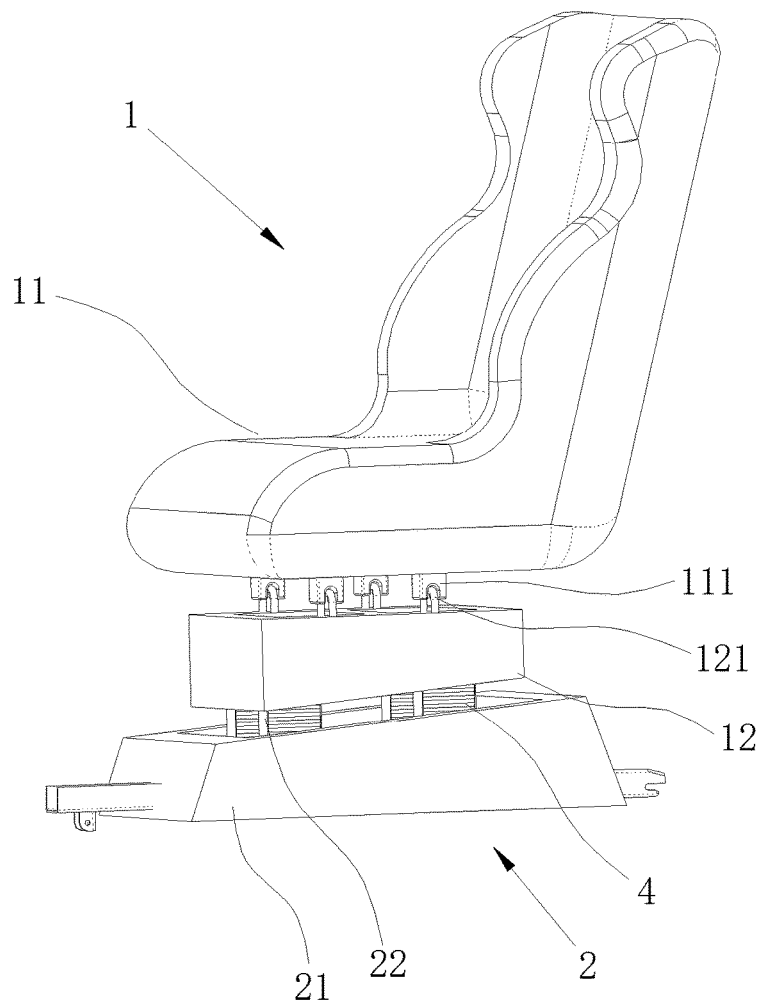
FIG. 11 is a space diagram of a child car seat of Embodiment 6 according to the present invention.

As shown in FIG. 11, the present embodiment has a similar structure with Embodiment 5, by differing in that: the rear end of the pathway of the sliding rail 21 providing support for the seat 1 to slide is lower than the front end thereof, and when a collision happens, the seat 1 slides along the downward pathway, and the energy absorbing material 4 is compressed by cooperating between the frame 12 and the limit block 22, and deforms so as to achieve the energy and shock absorbing purpose.

The present embodiment also may refer to variations of Embodiments 1 and 2, and employs an integrated structure with a sliding block at the bottom of the seat 1. Due to that it may refer to the above implementation, there is no more detailed description referring to accompanying drawings.

As above described, the present invention is explained according to the purpose thereof, but the present utility model is not limited to the above-mentioned embodiments and implement methods. Various variations and implementations can be made by the practitioners of the relative technical fields within the technical concept of the present invention.

What is claimed is:

1. An energy and shock absorbing device for a child car seat, comprising:
   a seat (1) including a seat body (11);
   a base (2) for supporting the seat (1), the seat (1) being arranged on the base (2) slidably along a path;
   a frame (12) detachably connected to the bottom of the seat body (11), the frame (12) comprising a crossbeam (123);
   a sliding block (122) provided at the bottom of the frame (12), at one or more of a left and right portion of crossbeam (123), and slidably fitting with the base (2);
   a limit block (22) being formed on the base (2) and located in front of the seat (1) in the path along which the seat (1) slides relative to the base (2); and
   an energy absorbing material (4) arranged on a planar supporting surface of the base (2), between the limit block (22) and the crossbeam (123), the energy absorbing material (4) being deformable to provide buffer force when the seat (1) slides towards the limit block (22) and cooperates with the limit block (22) to compress the energy absorbing material (4);
   wherein two sliding rails (21) are provided on the supporting surface for supporting the seat (1) to slide, the sliding rails (21) linearly extending lengthwise along a front-rear direction in the plane of the supporting surface with the energy absorbing material (4) being arranged between the two sliding rails (21);
   wherein the crossbeam and the limit block span between the two sliding rails and the energy absorbing material (4) engages a portion of the crossbeam (123) and the limit block (22) that spans between the sliding rails when the seat slides towards the limit block;
   wherein the energy absorbing material (4) is a honeycomb aluminum; and
   wherein an axis along a lengthwise greatest dimension of each hole of the honeycomb aluminum extends in the front-rear direction of the seat (1).

2. The energy and shock absorbing device for a child car seat according to claim 1, wherein a clamping seat (111) is provided on the seat body (11), a snap-fit element (121) is disposed on the frame (12), and the seat body (11) and the frame (12) are detachably connected by plugging-connected cooperation between the clamping seat (111) and the snap-fit element (121).

3. The energy and shock absorbing device for a child car seat according to claim 1, wherein a sliding block (10) is provided at the bottom of the seat (1), and the seat (1) is relatively slidably connected with the base (2) via the sliding block (10), and the energy absorbing material (4) is provided between the sliding block (10) and the limit block (22).

4. The energy and shock absorbing device for a child car seat according to claim 1, wherein the sliding rail (21) extends along a direction tilted to the horizontal plane, and the front end of the sliding rail (21) is higher or lower than the rear end of the sliding rail (21).

5. The energy and shock absorbing device for a child car seat according to claim 1, wherein a sliding rail (21) is provided on the base (2) for supporting the seat (1) to slide and extends along the front-rear direction, and the sliding rail (21) extends along an arc line.

6. The energy and shock absorbing device for a child car seat according to claim 1, wherein the base (2) is below the seat (1).

7. The energy and shock absorbing device for a child car seat according to claim 1, wherein the limit block (22) is formed by extending the base (2) upwards.

* * * * *